Patented Apr. 28, 1953

2,636,828

UNITED STATES PATENT OFFICE 2,636,828

SILICON NITRIDE-BONDED REFRACTORY OXIDE BODIES AND METHOD OF MAKING

Kenneth C. Nicholson, Niagara Falls, N. Y., assignor to The Carborundum Company, Niagara Falls, N. Y., a corporation of Delaware No Drawing. Application February 26, 1948, Serial No. 11,355

17 Claims. (Cl. 106—65)

This invention relates to compositions of matter and articles composed essentially of oxidic material and silicon nitride and the manufacture thereof, and more particularly to refractory compositions and articles.

There is a constant search for new compositions or bodies which will possess unexpected combinations of properties essential to or generally found to be desirable in specific fields of use. The oxidic bodies of the present invention in which an oxidic material is bonded by silicon nitride possess certain combinations of properties and characteristics which render them of considerable value, and they offer outstanding possibilities in a number of fields of use. It is, therefore, to be understood that the silicon nitride bonded oxidic bodies hereinafter more fully described are not to be considered as restricted to any particular field of use. However, their outstanding characteristics as a refractory material are particularly worthy of note and make them especially suitable for a number of refractory purposes. The present invention will therefore be primarily described in respect to the use of the herein described products for refractory purposes, although not intended to be limited thereto.

Above all a refractory body must possess refractoriness, that is, an ability to stand up under exposure to high temperatures without undue chemical or physical change. Other desirable characteristics sought in a refractory body or shape include an ability to resist sudden changes in temperature without cracking or other manifestations of body breakdown, a relatively high mechanical strength at elevated temperatures as well as at room temperature, chemical inertness and resistance to various corrosive and erosive substances and conditions, a resistance to oxidative influences, and a density and hardness dependent upon the use to which the refractory body is to be put.

In order to obtain a high degree of perfection in respect of one or more of the above properties peculiarly desirable for the specific refractory purpose in mind it has usually been found necessary to forego the benefits of maximum performance in respect of certain other desirable properties. Consequently, various refractory compositions exceptionally suitable for one field of use are found to be entirely unsatisfactory for other purposes. There is, therefore, a continual demand for refractory bodies of new composition which will meet those demands of a special nature which require a combination of properties not to be found in those compositions of a refractory type already available.

It is an object of the present invention to provide bonded oxidic bodies or shapes of unusual and distinctive compositions and properties.

It is another object of the present invention to provide refractory bodies or shapes having a particular combination of refractory properties heretofore unavailable in refractory compositions.

It is another object to provide compositions of matter comprising oxidic material bonded by silicon nitride.

It is a further object to provide practical methods of making such articles.

In accordance with the present invention shapes or bodies composed essentially of refractory oxidic material and silicon nitride are formed by mixing the desired refractory oxide or oxides or oxidic material in granular form with finely divided silicon metal, with or without the addition of a small amount of a temporary binder or plasticizer to provide green molded strength, compressing a mass of the material or forming an article of the desired shape by any of the well-known methods of formation such as pressure molding, tamping, slip-casting, extrusion or the like, drying the formed article and firing it in an atmosphere of nitrogen or in a non-oxidizing atmosphere containing nitrogen at a temperature and for a period of time sufficient to convert the silicon metal to silicon nitride. Particularly satisfactory bodies have been obtained with aluminum oxide, beryllium oxide, or thorium oxide in combination with finely divided silicon powder.

In order to convert the silicon metal in substantial entirety to silicon nitride the silicon metal should be in the neighborhood of 200 mesh (U. S. Standard Sieve) size or finer. The silicon nitride which is formed in situ from the silicon metal serves as an interstitial bond to strongly unite the oxidic material to provide a body of high mechanical strength, the amount of silicon nitride in the final article when high mechanical strength of the finished article is required being 25% or more of the weight of the article. As the amount of silicon nitride is increased above 25% greater strengths are obtained. However, satisfactory articles can be made with as low as 5% by weight of silicon nitride. Usually, the composition from which the article is made contains 25% or more by weight of silicon so that the final article, by reason of the increase in weight due to conversion of the silicon to silicon nitride, will contain appreciably more than 25% by weight of silicon nitride.

I have found that highly satisfactory results are to be obtained by using commercial grade silicon ground to suitable fineness. Analysis of a commercial grade of silicon which I have satisfactorily used in carrying out the present invention discloses, in addition to the silicon, the presence of the following impurities:

| | Percent |
|---|---|
| Iron | 0.87 |
| Chromium | 0.21 |
| Aluminum | 0.60 |
| Calcium | 0.54 |

In order to obtain a satisfactory conversion of the silicon to silicon nitride within a reasonable period of time when a commercial grade silicon powder of the above type is used the silicon should be fine enough to pass through a screen of around 200 mesh size (U. S. Standard Sieve) and finer, which is around 70 to 90 microns in particle size, more rapid nitriding being obtained when the silicon is of a fineness in the neighborhood of 10–20 microns and finer. Satisfactory conversion of the silicon to silicon nitride has also been obtained with pure silicon (99.8% silicon), although it has been found that when the pure form of silicon is used, the period of time required for nitriding is much longer than that required for nitriding articles of similar size and shape containing commercial grade silicon of the same degree of fineness provided the other conditions of the nitriding operation are the same. The rate of conversion of the silicon to silicon nitride when pure silicon is used can be increased by a reduction of the silicon to a finer particle size. It also has been found that the rate of conversion of the pure form of silicon to silicon nitride can be increased by adding a small percentage of iron power, say, in the neighborhood of ¾% to 1% by weight, which is the amount commonly found in commercial grade silicon, to the pure silicon. The greater ease of conversion of the silicon to silicon nitride when commercial grade silicon containing the aforementioned impurities is used as compared with the nitriding action obtained with pure silicon is therefore to be attributed to the presence of the small amount of iron impurity commonly found in the commercial grade of silicon metal.

Instead of the simple oxides, refractory oxidic materials such as the various refractory silicates or aluminates, including mullite, sillimanite, olivine, spinels, and refractory porcelains, can be blended with finely divided silicon metal, articles molded from the resulting mixture and fired in nitrogenous atmospheres as herein described to provide refractory shapes satisfactory for many purposes.

I have found that not all refractory oxides of high melting point when mixed with silicon metal in finely divided form and treated in the above manner provide articles suitable for refractory use. For example, when zirconia and silicon metal in the herein described proportions are mixed together, molded to shape, and fired in an atmosphere of nitrogen, the resulting article, although of satisfactory mechanical strength when initially formed, rapidly swells and disintegrates when heated in air. However, silicon nitride bonded zirconia bodies might be suitable for uses other than as a refractory body or for limited use under reducing conditions where oxygen is not present. Similarly, mixtures of chromium oxide and silicon metal are unsatisfactory since such mixtures upon firing tend to bloat and crack. Both silica and magnesium oxide when used alone as the refractory oxidic material with silicon are unable to stand up under conditions of heat shock and quickly spall or crack so as to be undesirable for many refractory purposes, although such bodies might be satisfactory for uses where sudden changes of temperature are not involved.

Oxidic bodies or shapes of the present invention have been made in the following manner. The silicon metal is first reduced to the required degree of fineness, namely, at least 200 mesh size (U. S. Standard Sieve) and finer, and preferably in the neighborhood of 300 mesh size, after which it is thoroughly mixed with the desired refractory oxide or oxides. The mixture of oxidic material and silicon metal, with or without a small amount of temporary binder to give added green strength, is moistened with water to a suitable molding consistency depending upon the particular manner of molding to be employed, and articles of the desired shape formed from the mixture. The thus formed articles are dried and then fired at a temperature of 1250–1420° C. in a nitrogen-containing, non-oxidizing, substantially non-carbonaceous atmosphere. The temperature can be raised above 1420° C. during the latter part of the nitriding operation and after the nitriding reaction has progressed for some period of time to further assure completion of the nitriding action.

Although commercial nitrogen gas is usually employed, ammonia gas or annealing hydrogen (containing 93% nitrogen and 7% hydrogen) can be used with satisfactory results. It is essential, however, that the nitrogen-containing gas be substantially non-oxidizing in character. It is also desirable that the nitrogenous gas atmosphere be substantially free from materials which provide elements other than nitrogen which are reactive with the silicon. Such materials include carbonaceous materials, such as carbon dioxide, carbon monoxide, hydrocarbons such as methane, or other constituents providing a source of elements such as oxygen or carbon which have a tendency to unite with silicon. However, the presence of slight amounts of carbonaceous substances as impurities in the nitrogen-containing atmosphere, although undesirable, can be tolerated and is not to be considered as a departure from the present invention.

In order that the invention may be clearly understood the following examples are submitted as illustrative of the compositions for and manner of carrying out the present invention:

EXAMPLE I

Lens fusion blocks approximately 3 inches square and ½ to ¾ of an inch in thickness with a convex upper surface have been made as follows:

| | Parts by weight |
|---|---|
| 150 and finer fused aluminum oxide | 50 |
| 200 and finer commercial grade silicon metal | 50 |
| Dextrin | 1 |

The above materials are thoroughly mixed and moistened with water to form a mix having a consistency suitable for pressure molding. The lens fusion blocks of the above specified size and shape are then formed by placing the moistened material in a steel mold and pressing at a pressure of 1500 pounds per square inch. The resulting molded shapes are then dried and placed in a muffle furnace and the normal atmosphere in the muffle replaced by a non-oxidizing atmosphere of nitrogen and then fired in a constant stream of nitrogen for several hours at a temperature of 1300° C. to 1400° C. The furnace is then allowed to cool while the flow of nitrogen is continued. When cool enough to handle the articles are removed from the muffle and are ready for use. The commercial grade silicon metal of the specified degree of fineness upon analysis was found to contain from 3/4% to 1% iron. If desired, the silicon metal can be further pulverized by grinding to reduce it to 300 mesh size and finer, in which case higher mechanical strength of the fired article is obtained.

EXAMPLE II

Crucibles, combustion boats and other shaped pieces have been made as follows:

|   | Parts by weight |
|---|---|
| 200 and finer thorium oxide | 50 |
| 200 and finer commercial grade silicon metal (as used in Example I) | 50 |
| Dextrin | 1 |

The above mixture is prepared as described in Example I with the exception that sufficient water is added to bring the mixture to slip-casting consistency. Pieces of the desired shape are then made by casting the thus formed slip in plaster of Paris molds according to standard slip casting practice for molding such articles, and the resulting shapes are removed from the molds and dried. The articles are then placed in a muffle of a muffle furnace and the air in the furnace muffle is replaced by a stream of nitrogen. The furnace as thus charged and prepared is then brought up to 1300° C. and the articles are fired in a stream of nitrogen at a temperature of 1300° C. to 1400° C. for 12 hours, whereupon the silicon metal is substantially entirely converted to silicon nitride to provide the desired finished articles. There is substantially no change in size or shape of the articles as a result of the firing operation.

While I have described in the above examples the making of various molded shapes in which the article is molded and nitrided in the exact shape and form in which it is intended for use, the present invention is not intended to be so restricted. Another way of making and using silicon nitride-bonded oxide bodies of the present invention is to mold the raw batch of material into briquettes or other shapes or otherwise compress a mass of the material having a composition the same as or similar to those given earlier herein for making the articles of the specified examples, after which the resulting briquettes or compressed bodies are nitrided in the manner already described. After removal from the furnace, they are crushed to granular form of the desired grit size. The resulting granular material can then be used in loose granular form as a high temperature insulation material, as, for example, insulation around jet engines and rocket combustion chambers, or as a layer of insulation around industrial furnace chambers. It may also be used as a loose filtering media or as a catalyst or catalyst carrier material. The granular material can also be bonded by means of sintered metals, vitreous or ceramic bonds or other bonding materials to form articles suitable for many of the industrial uses set forth elsewhere herein.

Likewise, articles or bodies can be made in accordance with the present invention in which pore-forming materials are incorporated in the raw batch from which the body is made for the purpose of providing a greater degree of porosity in the final body. A pore-forming material such as carbon or the like, which requires oxidation for removal from a body would require a preliminary burning out of the pore-forming material at lower temperatures. Therefore, the pore-forming material preferably should be a material which is removed by volatilization during the drying and/or firing operation such as powdered or granular naphthalene, various organic resinous materials such as phenolic resins and the like or one which provides pores by reason of the generation of a gas. The resulting bodies, which have greater porosity than those made with no pore formers, are particularly useful in the fabrication of porous filtering media, catalysts and catalyst carriers, insulation bodies and the like, whether in crushed granular form or in the form of molded shapes of predetermined contour.

Oxidic bodies or shapes composed of refractory oxidic material including such oxides as alumina, beryllia and thoria bonded by silicon nitride formed in situ in the manner hereinabove described are hard and dense and resemble sintered ceramic shapes in these respects, and are of high mechanical strength. Table I below sets forth the modulus of rupture at room temperature and the resistance to heat shock of several typical refractory compositions made in accordance with the present invention and embodying silicon nitride bonded refractory oxides.

The resistance to heat shock as given in the table below is determined as follows: The body to be tested is heated to 950° to 1050° C. and then, without delay, is withdrawn and exposed to a blast of cold compressed air until the temperature of the test piece is lowered to room temperature. The test piece is then examined for cracks. This complete operation of heating to 950°–1050° C., followed by sudden cooling in a blast of cold air is designated as one cycle. The test piece is subjected to repeated heating and blast cooling until the piece has failed due to cracking or until it has survived 15 cycles.

*Table I*

| Body Composition Prior to Firing (Exclusive of Temporary Binder) | Modulus of Rupture at Room Temperature, Pounds per Square Inch | Resistance to Heat Shock |
|---|---|---|
| 50% ThO$_2$ and 50% Si | 9,150 | No cracks after 15 cycles. |
| 75% ThO$_2$ and 25% Si | 4,769 | Do. |
| 50% Al$_2$O$_3$ and 50% Si | 7,320 | Cracked after 7th cycle. |
| 75% Al$_2$O$_3$ and 25% Si | 4,950 | No cracks after 15 cycles. |
| 50% BeO and 50% Si | 6,560 | Do. |
| 75% BeO and 25% Si | 4,910 | Do. |
| 50% ZrO$_2$ and 50% Si | 10,500 | Swells and disintegrates when heated in air on first cycle of test. |
| 75% ZrO$_2$ and 25% Si | 6,500 | Do. |
| 50% SiO$_2$ and 50% Si | 7,525 | Cracked after 2nd cycle. |
| 75% SiO$_2$ and 25% Si | 3,120 | |
| 25% MgO and 75% Si | 7,425 | Cracked after 2nd cycle. |
| 50% MgO and 50% Si | 6,790 | |
| 75% MgO and 25% Si | 2,550 | |

The refractory bodies containing alumina, beryllia or thoria, as shown in Table I, are extremely resistant to heat shock. In fact, bodies such as those above listed containing alumina, beryllia or thoria can be heated to 900–1000° C. and plunged directly into cold water without cracking.

The herein-described oxidic bodies are also chemically inert with respect to various corrosive chemicals such as strong acids and alkalies, although they are subject to attack by fused caustic. Despite the presence of a high percentage of silicon nitride as the bonding ingredient, the articles as herein formed exhibit a satisfactory degree of resistance to oxidation. For example, Table II below presents the extent of oxidation of typical silicon nitride bonded oxide bodies after exposure to oxidizing conditions at a temperature of 950–1050° C. over extended periods of time.

*Table II*

| Body Composition (Prior to Firing and Exclusive of Temporary Binders) | Percentage Gain in Weight after Heating In Air at 950–1050° C. | | | |
|---|---|---|---|---|
| | 15 Hrs. | 31 Hrs. | 49 Hrs. | 70 Hrs. |
| | *Percent* | *Percent* | *Percent* | *Percent* |
| 50% ThO₂ and 50% Si | 2.91 | 3.36 | 4.32 | 4.89 |
| 50% BeO and 50% Si | 4.03 | 5.23 | 6.91 | 7.56 |
| 50% Al₂O₃ and 50% Si | 3.60 | 4.43 | 5.32 | |

It is to be understood that the products of the present invention in its various modifications are not limited to any specific field or fields of use such as might be defined by the specific examples previously set forth. The products can be made in any desired shape as well as provided in granular or aggregate form. They are, therefore, not only suited for many of the uses for which industrial refractories are required, including bricks, blocks, setter tile, muffles, kiln furniture, and special shapes for application in and around furnaces and other high temperature equipment, but they are also well suited for many specialty high temperature applications, such as jet engine combustion chambers, linings for exhaust nozzles, rocket combustion chambers and exhaust nozzles, turbine blades, stator blades, lens fusion blocks, spark plug bodies, and the like. They are also suitable for the fabrication of laboratory ware, including combustion boats, crucibles, burner holders, and other shapes. The resistance of such bodies to chemical attack make them highly suitable for the making of articles used in the containing, conveying, and handling of many acids, alkalies and other corrosive chemicals, including such articles as chambers and chamber linings, crucibles, pipes and pipe fittings, and other sundry shapes. The bodies of the present invention, particularly when modified by the use of pore formers in the raw batch from which the bodies are made, are also highly useful as diffusion and filtering media, such as diffusion tubes and plates, filtering tubes, plates and shapes, or as catalysts or catalyst carriers and supports. Materials and articles of the present invention can also be used for making abrasive articles such as grinding wheels, sharpening stones, razor hones, and other grinding and polishing shapes and materials. The dielectric properties make the present bodies useful in many articles in the electrical and radio industry including supports in electric light bulbs, radio tubes, X-ray tubes and radar equipment, resistors and grid leaks. Other miscellaneous uses include its use as thread guides, wire drawing dies, blasting nozzles, heating elements, and the like.

Having described the present invention it is desired to claim:

1. As a new article of manufacture, a body consisting essentially of aluminum oxide particles bonded together by silicon nitride having the chemical formula $Si_3N_4$, the amount of silicon nitride being more than 25% by weight of the body.

2. As a new article of manufacture, a body consisting essentially of beryllium oxide particles bonded together by silicon nitride having the chemical formula $Si_3N_4$, the amount of silicon nitride being more than 25% by weight of the body.

3. As a new article of manufacture, a body consisting essentially of thorium oxide particles bonded together by silicon nitride having the chemical formula $Si_3N_4$, the amount of silicon nitride being more than 25% by weight of the body.

4. As a new article of manufacture, a body consisting essentially of refractory oxidic material selected from the group of refractory oxides consisting of aluminum, beryllium and thorium bonded together by silicon nitride having the chemical formula $Si_3N_4$, the amount of silicon nitride being more than 25% by weight of the body.

5. A raw batch for the manufacture of oxidic bodies, said batch comprising a refractory oxidic material and at least 25% by weight of finely divided silicon metal having a particle size of 200 mesh and finer, said silicon metal containing approximately ¾% to 1% iron.

6. A method of making articles of manufacture comprising forming an article of the desired shape from a mixture comprising finely divided silicon metal containing ¾% to 1% by weight of iron and having a particle size of 200 mesh and finer, and a refractory oxidic material selected from the group of refractory oxides consisting of aluminum oxide, beryllium oxide and thorium oxide, and firing the formed article in a non-oxidizing atmosphere containing nitrogen to thoroughly convert the silicon metal to silicon nitride having the chemical formula $Si_3N_4$.

7. A method of making articles of manufacture comprising forming an article of the desired shape from a mixture comprising finely divided silicon metal, ¾% to 1% by weight of iron based on the weight of the silicon metal, and a refractory oxidic material selected from the group of refractory oxides consisting of aluminum oxide, beryllium oxide and thorium oxide, the silicon metal having a particle size of 200 mesh and finer, and firing the formed article in a non-oxidizing, substantially non-carbonaceous atmosphere containing nitrogen to thoroughly convert the silicon metal to silicon nitride having the chemical formula $Si_3N_4$.

8. A method of making articles of manufacture comprising forming an article of the desired shape from a mixture comprising finely divided silicon metal containing ¾% to 1% by weight of iron and having a particle size of 200 mesh and finer, and a refractory oxidic material selected from the group of refractory oxides consisting of aluminum oxide, beryllium oxide and thorium oxide, and firing the formed article at a temperature of 1250–1425° C. in a non-oxidizing atmosphere containing nitrogen to thoroughly convert the silicon metal to silicon nitride having the chemical formula $Si_3N_4$.

9. A method of making articles of manufacture comprising forming an article of the desired shape from a mixture comprising finely divided silicon metal having a particle size of 200 mesh and finer, and a refractory oxidic material, and firing the formed article in a non-oxidizing atmosphere containing nitrogen to thoroughly convert the silicon metal to silicon nitride having the chemical formula $Si_3N_4$.

10. An article of manufacture comprising refractory oxidic material held together by an interstitial silicon nitride bond in which substantially all the silicon is combined with nitrogen as silicon nitride having the chemical formula $Si_3N_4$, said silicon nitride bond containing an amount of iron sufficient to effectively promote the conversion of silicon to silicon nitride having the chemical formula $Si_3N_4$, said article having a modulus of rupture at room temperature of several thousand pounds per square inch and being capable of resisting oxidation in air at elevated temperatures.

11. A new material of manufacture comprising refractory oxidic material held together by an interstitial silicon nitride bond in which substantially all the silicon is combined with nitrogen as silicon nitride having the chemical formula $Si_3N_4$, said bond containing an amount of iron sufficient to effectively promote the conversion of silicon to silicon nitride having the chemical formula $Si_3N_4$.

12. A new material of manufacture comprising refractory oxidic material held together by an interstitial silicon nitride bond in which substantially all the silicon is combined with nitrogen as silicon nitride having the chemical formula $Si_3N_4$, said bond containing ¾% to 1% by weight of iron based on the amount of the bond.

13. A raw batch for the manufacture of oxidic bodies bonded by silicon nitride having the chemical formula $Si_3N_4$, said batch comprising a refractory oxidic material and at least 25% by weight of finely divided silicon metal having a particle size of 200 mesh and finer, and containing an amount of iron sufficient to effectively promote the conversion of silicon to silicon nitride having the chemical formula $Si_3N_4$.

14. A raw batch for the manufacture of oxidic bodies bonded by silicon nitride having the chemical formula $Si_3N_4$, said batch comprising a refractory oxidic material selected from the group of refractory oxides consisting of alumina, beryllia and thoria, and finely divided silicon metal having a particle size of 200 mesh and finer, and containing an amount of iron sufficient to effectively promote the conversion of silicon to silicon nitride having the chemical formula $Si_3N_4$.

15. A raw batch for the manufacture of oxidic bodies bonded by silicon nitride having the chemical formula $Si_3N_4$, said batch comprising aluminum oxide and at least 25% by weight of finely divided silicon metal having a particle size of 200 mesh and finer, and containing an amount of iron sufficient to effectively promote the conversion of silicon to silicon nitride having the chemical formula $Si_3N_4$.

16. A raw batch for the manufacture of oxidic bodies bonded by silicon nitride having the chemical formula $Si_3N_4$, said batch comprising beryllium oxide and at least 25% by weight of finely divided silicon metal having a particle size of 200 mesh and finer, and containing an amount of iron sufficient to effectively promote the conversion of silicon to silicon nitride having the chemical formula $Si_3N_4$.

17. A raw batch for the manufacture of oxidic bodies bonded by silicon nitride having the chemical formula $Si_3N_4$, said batch comprising thorium oxide and at least 25% by weight of finely divided silicon metal having a particle size of 200 mesh and finer, and containing an amount of iron sufficient to effectively promote the conversion of silicon to silicon nitride having the chemical formula $Si_3N_4$.

KENNETH C. NICHOLSON.

References Cited in the file of this patent

UNITED STATES PATENTS

| Number | Name | Date |
|---|---|---|
| 866,444 | Egly | Sept. 17, 1907 |
| 962,170 | Winding-Larsen | June 21, 1910 |
| 1,386,227 | Becket | Aug. 2, 1921 |
| 2,467,647 | Alexander | Apr. 19, 1949 |

FOREIGN PATENTS

| Number | Country | Date |
|---|---|---|
| 30,869 | Austria | 1907 |
| 5,161 | Great Britain | 1910 |
| 54,566 | Switzerland | 1910 |

OTHER REFERENCES

J. W. Mellor: "Comprehensive Treatise on Inorganic and Theoretical Chemistry," vol. 8, pages 115, 117.